Oct. 10, 1967  W. B. CRUMPLER  3,345,866
MULTILEGGED SUPPORT SYSTEM
Filed Dec. 29, 1964  3 Sheets-Sheet 1

INVENTOR
WEYMOUTH B. CRUMPLER

BY
ATTORNEYS

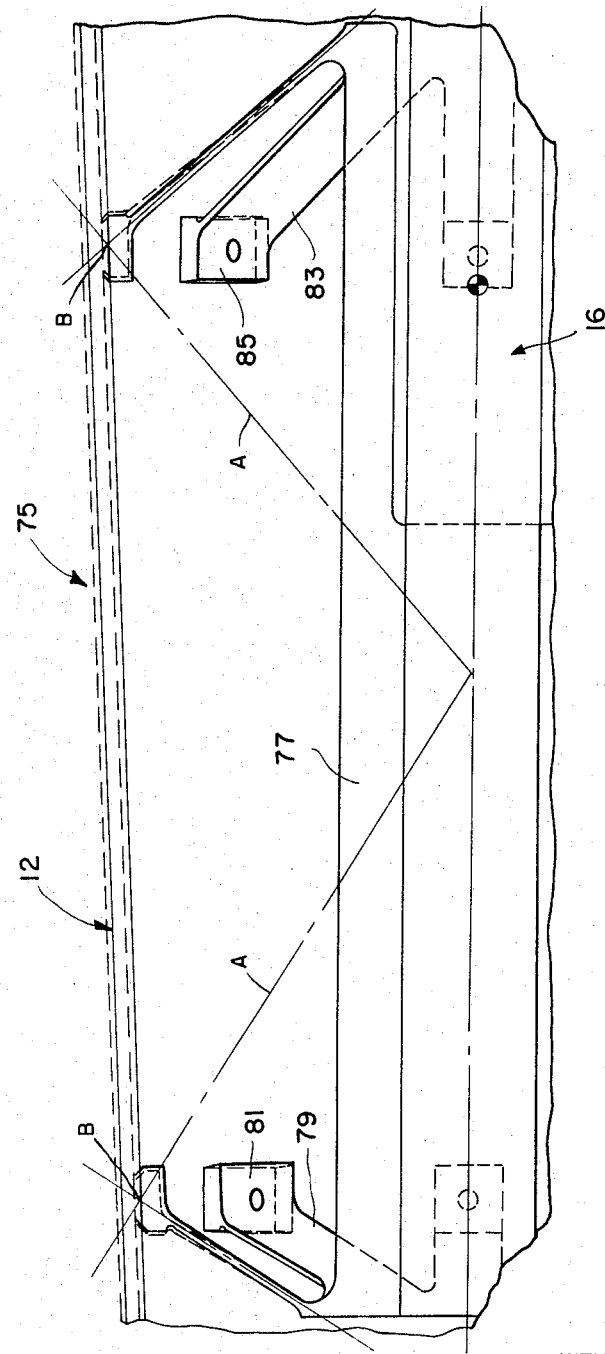

United States Patent Office 3,345,866
Patented Oct. 10, 1967

3,345,866
MULTILEGGED SUPPORT SYSTEM
Weymouth B. Crumpler, Newport News, Va., assignor to the United States of America as represented by the Administrator of the National Aeronautics and Space Administration
Filed Dec. 29, 1964, Ser. No. 422,097
10 Claims. (Cl. 73—147)

ABSTRACT OF THE DISCLOSURE

A multilegged support system holds and positions a test model with respect to a wind tunnel balance and sting mount. A group of legs are located at opposite ends of the test model and are rigidly fixed to it and the balance forming the support. The legs are equally spaced about the group, flexible, and as long and thin as adequate support will allow. They are positioned essentially normal to the direction of model skin growth during thermal expansion.

The invention described herein may be used by or for the Government of the United States of America for governmental purposes without the payment of any royalties thereon or therefor.

This invention relates to a support system for wind tunnel test models or like structures, and more particularly to a multilegged support system wherein the test model or other structure is subjected to thermal and dynamic loading.

One of the major problems in supporting test structures in a wind tunnel is to provide means whereby the actual prime loads applied to the test structure are transferred to the balance or other measuring mechanism without occurring and inducing error from secondary loads caused by dimensional change of the structure. This is particularly true when the test structure temperature is very high, since the stresses due to skin growth as a result of the thermal loading are invariably transferred to the balance along with the investigative aerodynamic loading. Obviously, this results in error which can be considerable with temperatures in the neighborhood of 1,200° F. and above. Also, thermal expansion of relatively thin test structures rigidly fastened to relatively strong supporting structure causes the thin test structure to dimple, buckle or rupture with very little dimensional change from expansion.

One way of overcoming the above difficulty is to cool the test structure so that it remains within tolerable temperature and expansion limits. Although this appears to be an obvious solution, it is not always desirable to cool the test model, and under certain test conditions it is mandatory that the test structure not be cooled in order to simulate the desired test environment. Such is the case in testing models which are designated to operate as reentry configurations from space into atmosphere. A true test of the model cannot be made unless it is subjected to the intense heat similar to that of which a reentry vehicle is subjected. Thus, it becomes clear that the test structure cannot be cooled to eliminate the problem of stresses transferred by thermal expansion.

The present invention overcomes the above-mentioned difficulties by providing a multilegged flexible support system wherein the lengthwise axis of the flexible legs that support the thermally-cycling test structure are arranged essentially normal to the absolue direction of dimensional change motion of the test structure. With this arrangement it has been found that the test structure is allowed to grow due to thermal expansion without developing and transmitting large internal loads to the balance. The flexible support legs undergo a generally S-curve flexure so that the thermally-cycling test structure is free to change dimension radially as well as longitudinally.

It is, therefore, an object of the invention to provide a support system for test structures wherein the loads created as a result of the thermal expansion thereof are minimized and not transmitted to a measuring device forming part of the system.

A further object of the invention is to provide a multilegged flexible support system for test structure wherein the flexible legs of the support are arranged such that they are essentially normal to the line of absolute dimensional change motion of the test structure undergoing thermal expansion and dynamic loads.

Still another object of this invention is to provide a multilegged flexible support system wherein the flexible legs are as long, wide, thin, and numerous as the test facility will allow, and continue to support the test structure.

An object of the invention is to provide a multilegged flexible support system for structures which can be thermally and dynamically loaded without dimpling, buckling or rupturing.

A further object of the invention is to provide a multilegged flexible support system for test structure which can be thermally and dynamically loaded without the necessity of auxiliary cooling for the test structure.

Yet another object of this invention is to provide a support system for large test structures suitable for use in a hypersonic continuous flow wind tunnel subjected to temperatures of 1,200° F. and above.

An additional object of this invention is to provide a multilegged flexible support system which is of simple design, and is economical to manufacture and maintain.

A further object of this invention is to provide a multilegged flexible support system for thermally and dynamically loaded test structure having flexible legs which may appear in various geometrical configurations.

These and other objects and advantages of the invention will become more apparent upon reading the specification taken in conjunction with the accompanying drawings.

In the drawings:

FIG. 4 is a cross-sectional view showing a modified multilegged support system and the angular relationship of the support legs with respect to the balance and test structure.

Basically, the invention relates to a multilegged flexible support system for a thermally and dynamically loaded test model located in the test section of a wind tunnel. The test section is provided with the usual sting which in turn supports a balance. A cylinder surrounds the balance and is secured thereto in a conventional manner such as by screws. The cylinder in turn carries a multilegged support structure which is secured to either end thereof by threaded fasteners. The multilegged support structure has a central annulus with flexible legs directed radially therefrom at spaced intervals thereabout. Support feet are formed integral with the outer extremities of the flexible legs and are rigidly secured to the test model which is supported thereby. The multiple legged structure appearing at each end of the support cylinder have the legs thereof directed toward each other at an angle which is essentially normal to the direction of absolute dimensional change motion of the test model, the dimensional change motion of the model being due to thermal expansion and dynamic loading.

Figure 1:
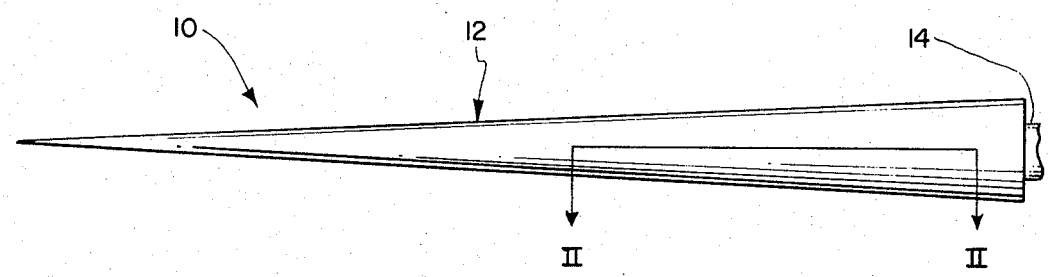
FIG. 1 is a side elevational view of a conical test structure supported by the multilegged support system of the invention.
Figure 3:
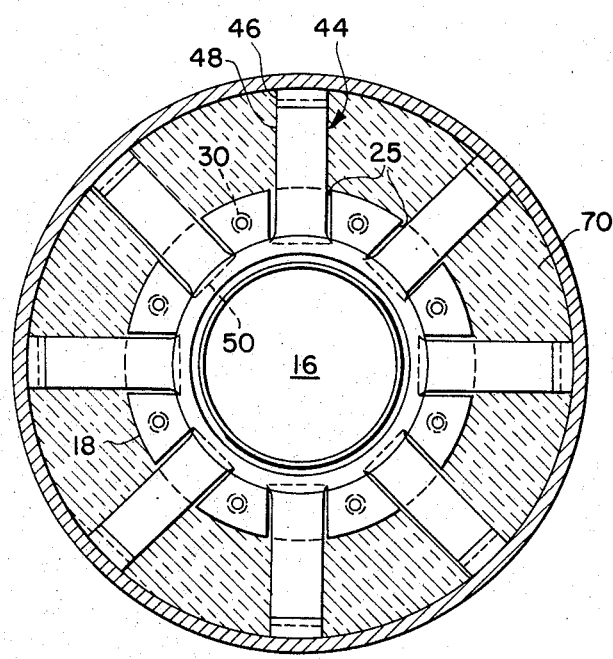
FIG. 3 is a cross-sectional view taken along the section lines III—III of FIG. 2.

Referring now more specifically to the details of the invention, FIG. 1 illustrates the multilegged support system designated generally by the reference numeral 10. The system includes generally the test model 12 which is shown as conical; however, it might take other configurations, supported on the sting 14 which in turn carries the remainder of the multilegged support structure.

Figure 2:
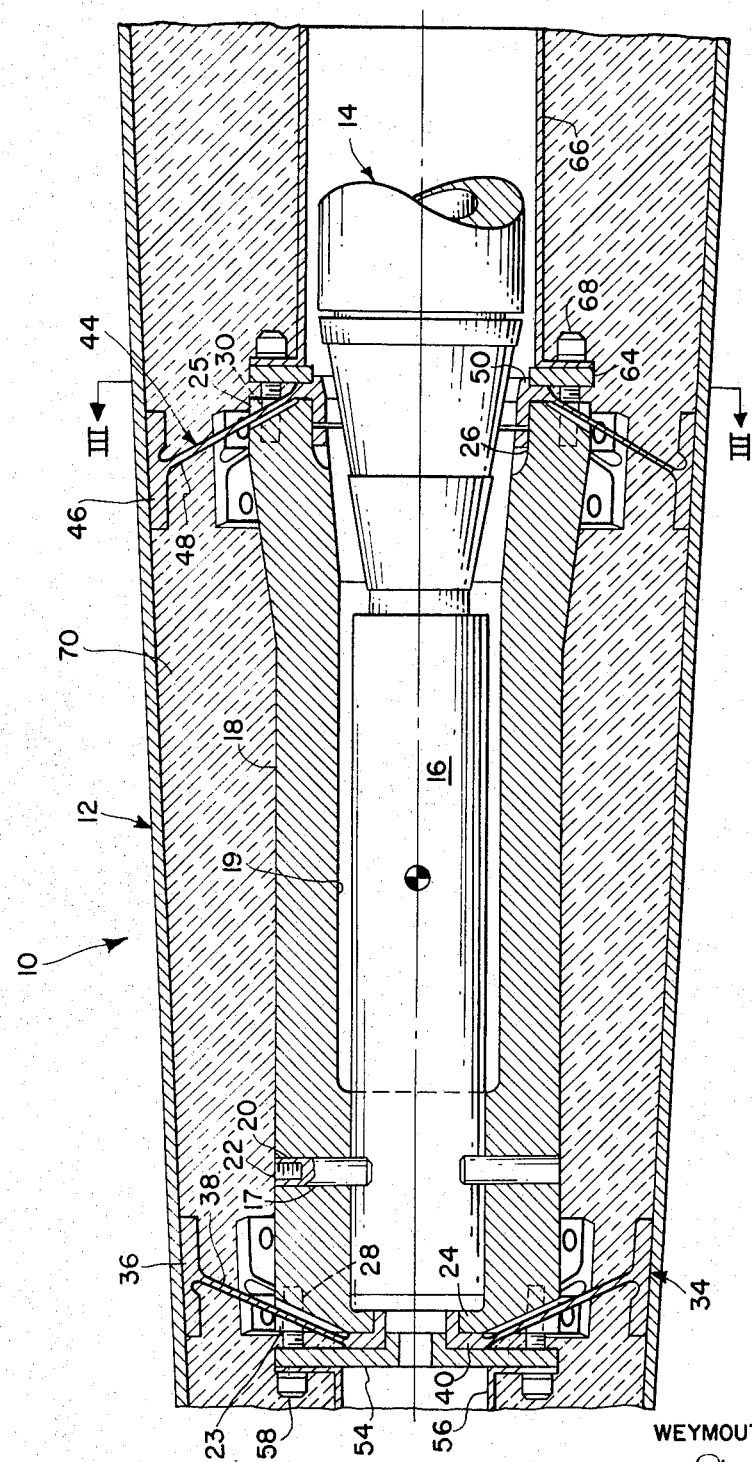
FIG. 2 is a cross-sectional view taken along the section lines II—II of FIG. 1 showing the multilegged support system.

The sting 14 is of conventional design made of a material which will withstand the temperatures to which the test model is to be subjected. A balance 16 (FIG. 2), also of conventional design, is secured to the sting 14 in the usual manner. Information from the test structure is transmitted to the balance via the multilegged flexible support and measured by apparatus housed therein and a cable is provided to convey this information to a remote point outside the test section (the latter of which are not shown). This structure is also of conventional design.

The actual structure which supports the test structure 12, includes a support cylinder 18 which surrounds at least a portion of the balance 16 and sting 14 combination. The inside of the cylinder 18 has a stepped opening with a reduced portion which has a sliding fit with the balance 16. This arrangement maintains the support cylinder 18 in a symmetric position with respect to the balance. The support cylinder 18 has a series of threaded apertures 20 which receive balance lock screws 22 that engage threaded bores 17 formed in the balance 16. The balance lock screws are located at spaced intervals about the circumference of the balance such that the support cylinder 18 is rigidly secured to the balance 16.

The forward end of the cylinder has a series of cutouts or notches 23 formed at equally spaced intervals thereabout shaped to accommodate the legs of the support system (to be explained more fully hereinafter). These cutouts are of sufficient size and positioned at an angle such that the legs of the support are free to move laterally in a direction normal to the flatness of the leg without interference. A similarly shaped series of cutouts are provided at the other end of the support cylinder for the same purpose.

The forward end of the cylinder 18 also has an inwardly directed annular-shaped lip 24 which assists in locating the support structure. The other end of the cylinder has a shoulder 26 which serves a similar purpose.

Both the forward and aft ends of the cylinder have threaded holes 28 and 30 respectively to receive threaded screws for securing the support structure to the cylinder in a manner to be described more fully hereinafter.

The front multilegged support is designated generally by the reference numeral 34. The general configuration of the multilegged support is that of the hub of a wheel having spokes radiating therefrom at spaced intervals thereabout. The front support legs 38 have integrally formed support feet 36 which are adapted to be secured to the test structure or model 12. The legs 38 are otherwise formed integral with a collar 40 which would form the hub of the spoked wheel leg arrangement. The legs 38 are made of a material which will withstand heating from thermal conductivity and thermal environment and designed to be as long and thin as practical to provide adequate support for the test structure. The lengthwise axes of the legs are designed to be mounted approximately normal to the line of absolute dimensional change motion of the model skin at the support feet attachment point to the model skin.

The rear multilegged support 44 is of similar design and has support feet 46, support legs 48 and a support collar 50. The multilegged support structures face each other and are so arranged that if their lengthwise axes were extended they would cross at a point outside the model. The feet of the multilegged supports may be attached to the model in a conventional manner such as by welding or threaded fasteners. As viewed in FIG. 2, the collars 40 and 50 of the multilegged supports appear to be generally L-shaped in cross section, and the projection thereof is associated with the cylinder lip 24 and shoulder 26 such that the multilegged supports are properly positioned with respect to the cylinder.

An annular flange 54 is provided with a series of apertures which are alined with the holes formed in the cylinder 18, the flange apertures receiving retaining screws 58 that are threaded into the holes 28. The annular flange 54 abuts against the collar 40 of the multilegged support and when the retaining screws 58 are tightened fixes the multilegged support with respect to the support cylinder 18. The multilegged support 44 is retained in position in a similar manner by a washer 64 having apertures which receive threaded fasteners 68 engaging the threaded apertures 30 in the cylinder 18.

Tubular insulation carriers 56 and 66 are attached to the front and rear of the multilegged support system by the fasteners 58 and 68. The insulation carriers 56 and 66 have outwardly turned flanges with holes which receive the retaining screws 58 and 68, the heads of the retaining screws abutting against the flanges to hold the insulation carriers in position. Insulation 70 is packed about the multilegged support system and the insulation carriers thus forming a heat shield between the model and sting and between the model and the balance. The insulation carriers 56 and 66 also allow the insulation to be packed both forward and aft of the main multilegged support system.

The arrangement shown in FIG. 4 is a modification of the multilegged support system designated generally by the reference numeral 75. This arrangement differs in that the legs of the support system are formed integral with the support cylinder. Thus, the cylinder 77 has formed at one end legs 79 and feet 81, and at the other end legs 83 and feet 85. The feet 81 and 85 are fixed to the model 12 as in the previously described arrangement. The support cylinder 77 is secured to the balance 16 by inserting a cutout portion thereof on the balance 16 as shown in FIG. 4. In addition, the cylinder 77 may be anchored to the balance 16 by threaded fasteners, sweating or other conventional fastening techniques.

From the above description, the operation of the device is believed to be apparent. The multilegged supports are fixed to the support cylinder and the cylinder to the sting and balance combination. The test model is then fixed to the legs of the multilegged supports.

As shown by the alternate long lines and dashes in FIG. 4, the angles of the legs are positioned so that they are approximately normal to the line of absolute dimensional change motion A of the model skin at the leg attachment points B to the skin. The word "approximate" is used since a small variation from normal may be required to correct for temperature gradients in the legs and center support combined with variations in dynamic loads imposed on the test model. The line of absolute dimensional change motion of the model skin is the motion line or direction the model skin travels when subjected to test. For the particular embodiment shown in FIG. 4, it is the line A. The shape or direction of this line may change as the configuration of the test model changes and would have to be determined for each model.

The model, sting and multilegged structure is mounted in the wind tunnel or similar test chamber and subjected to high temperatures and aerodynamic forces. Under test, the model is allowed to expand both diametrically and lengthwise without dimpling, buckling or rupture of the model skin. As the skin expands, the multilegs which are flexible, flex to form an S-curve and the leg feet which are attached to the skin move with the skin. The position of the legs and the flexure thereof allows the forces transmitted to the balance strain gages or other measuring devices to be recorded without error which might be produced by thermal expansion. The insulation allows the internal support structure to be isolated from the heat sources so that the major heat flows are restricted to occurring along the supporting legs while minimizing undesirable heating of the internal balance (measuring apparatus). This arrangement also assists in preventing the forces of thermal expansion from being transmitted to the same internal measuring apparatus.

Due to the fact that the multilegged support system is to be used in an environment which deals with excessive temperature gradients (up to 1,200° F.) and considers a statically indeterminate structure that has up to 90 redundancies, it may be necessary to incorporate certain design changes in any multilegged support system. However, the development has shown that the rule of thumb whereby the supporting legs are positioned approximately normal to the line of absolute dimensional change motion of the structure the support applies to all configurations of supporting legs. It should, therefore, be understood that the principle has application to support legs having the configuration of a single-legged cantilever beam under component loading, to a flat diaphragm with radial slots, to a slotted cone, to a plane trapezoidal bent under in-plane and out-of plane loading, to the multilegged configuration as described and shown herein and to other configurations. This arrangement not only provides solutions to the problem of minimizing static internal stresses, but also safeguards against structural fatigue from thermal cycling, and aids in overcoming the tendency for tempering or drawing of heat-hardenable materials in balance-measuring equipment.

While one embodiment of this invention and the modification thereof have been described, it will be understood that other modifications and improvements may be made thereto. Such of these modifications and improvements as incorporate the principles of the invention are to be considered as included in the hereinafter appended claims.

What is claimed as new and desired to be secured by Letters Patent of the United States is:

1. A support system for wind tunnel test models and the like comprising: sting means; balance means supported by said sting means; support means carried by said balance means having the lengthwise axis thereof positioned essentially normal to the line of absolute dimensional change motion of a test model structure under test conditions; and a test model fixed to said support means.

2. A support system for thermally and dynamically loaded structures comprising: base means; support means fixed to said base means having its lengthwise axis positioned essentially normal to the line of absolute dimensional change motion of a structure attachable thereto subjected to loads; a structure subjected to various loads carried by said support means.

3. A support system for thermally and dynamically loaded test models and the like comprising: a sting; a balance fixed to said sting; a support cylinder carried by said balance; multileg flexible support structure secured to said support cylinder being arranged normal to the line of absolute dimensional change motion of a test structure such that test structure skin growth will not be restricted and thereby develop additional internal structural load due to thermal expansion; and test structure fastened to said multileg flexible support structure.

4. A support system for thermally and dynamically loaded test models and the like as in claim 3 wherein said multileg flexible support structure includes at least two groups of legs spaced from each other along the support cylinder.

5. A support system for thermally and dynamically loaded test models and the like as in claim 3 wherein said multileg flexible support structure is formed integral with said support cylinder.

6. A support system for thermally and dynamically loaded test models and the like as in claim 3 wherein the legs of said multileg flexible support structure are flexible; said flexible legs being as long, wide, thin and numerous as a test section will accommodate and support the test structure.

7. A support system for thermally and dynamically loaded test models and the like as in claim 3 wherein the multileg flexible support structure includes at least two groups of legs spaced from each other along the support cylinder; the legs of said multileg support structure being flexible; said flexible legs being as long, wide, thin and numerous as a test section will accommodate and support the test structure.

8. A support system for thermally and dynamically loaded test models and the like comprising: a sting; a balance supported by said sting; a support cylinder surrounding said balance and being fixed thereto; a first multileg flexible support structure secured to one end of said support cylinder; a second multileg flexible support structure secured to the other end of said support cylinder; test structure carried by said first and second multileg support structure; legs of said first and second multileg support structure being directed toward each other and being positioned at an angle such that the lengthwise axes thereof are essentially normal to the line of absolute dimensional change motion of the test structure at the point of connection to the test structure.

9. A support system for thermally and dynamically loaded test models and the like as in claim 8 wherein said legs of said first and second multileg flexible support structure are flexible and spaced at equal intervals radially about the support structure; and insulation material placed around said first and second multileg flexible support structures and between said support cylinder and test structure.

10. A support system for thermally and dynamically loaded test models and the like as in claim 8 wherein said multileg flexible support structure is removable from said support cylinder; and means for securing said multileg flexible support structure to said support cylinder.

References Cited
UNITED STATES PATENTS

| | | | |
|---|---|---|---|
| 2,485,977 | 10/1949 | Mains | 73—147 |
| 2,782,636 | 2/1957 | Peucker | 73—147 |
| 3,015,231 | 1/1962 | Ganahl | 73—116 |

DAVID SCHONBERG, *Primary Examiner.*